United States Patent
Carey et al.

(10) Patent No.: US 7,137,502 B2
(45) Date of Patent: Nov. 21, 2006

(54) MAIL TRAY SINGULATOR AND METHOD OF USE

(75) Inventors: Patrick J. Carey, Endwell, NY (US); Thomas M. Brown, Vestal, NY (US); Dale J. Larson, Newark Valley, NY (US)

(73) Assignee: Lockheed Martin Corporation, Bethesda, MD (US)

(*) Notice: Subject to any disclaimer, the term of this patent is extended or adjusted under 35 U.S.C. 154(b) by 518 days.

(21) Appl. No.: 10/139,678

(22) Filed: May 7, 2002

(65) Prior Publication Data

US 2003/0209408 A1 Nov. 13, 2003

(51) Int. Cl.
*B65G 47/00* (2006.01)

(52) U.S. Cl. ....................... 198/444; 198/399

(58) Field of Classification Search ................ 198/444, 198/396, 399
See application file for complete search history.

(56) References Cited

U.S. PATENT DOCUMENTS

| | | | | |
|---|---|---|---|---|
| 3,752,293 A | * | 8/1973 | Fort | 198/383 |
| 4,121,403 A | * | 10/1978 | Bogdanski et al. | 53/202 |
| 4,215,774 A | * | 8/1980 | Manservisi | 198/444 |
| 4,360,098 A | * | 11/1982 | Nordstrom | 198/418.1 |
| 4,838,435 A | * | 6/1989 | Alexandre et al. | 209/555 |
| 4,889,224 A | * | 12/1989 | Denker | 198/382 |
| 5,092,451 A | * | 3/1992 | Jones et al. | 198/460.1 |
| 5,103,962 A | * | 4/1992 | Voss et al. | 198/443 |
| 5,141,097 A | * | 8/1992 | Oiry et al. | 198/460.1 |
| 5,165,520 A | * | 11/1992 | Herve et al. | 198/460.1 |
| 5,346,358 A | * | 9/1994 | Benuzzi | 414/790.9 |
| 5,372,236 A | * | 12/1994 | Layer | 198/392 |
| 5,460,271 A | * | 10/1995 | Kenny et al. | 209/576 |
| 5,638,938 A | | 6/1997 | Lazzarotti et al. | |
| 5,740,901 A | | 4/1998 | Lazzarotti et al. | |
| 5,816,383 A | | 10/1998 | Maier et al. | |
| 5,904,236 A | | 5/1999 | Affeldt et al. | |
| 5,950,800 A | * | 9/1999 | Terrell et al. | 198/448 |
| 6,092,643 A | | 7/2000 | Herzog | |
| 6,170,639 B1 | | 1/2001 | Diederich | |
| 6,206,174 B1 | | 3/2001 | Koltz | |
| 6,227,351 B1 | | 5/2001 | Leisner | |
| 6,244,421 B1 | | 6/2001 | Hall | |
| 6,259,967 B1 | | 7/2001 | Hartlepp et al. | |
| 6,269,933 B1 | * | 8/2001 | Schuitema et al. | 198/446 |
| 6,328,151 B1 | | 12/2001 | Spangenberg et al. | |
| 6,609,607 B1 | * | 8/2003 | Woltjer et al. | 198/457.03 |
| 6,622,847 B1 | * | 9/2003 | Schuitema et al. | 198/399 |

* cited by examiner

*Primary Examiner*—Joe Dillon, Jr.
(74) *Attorney, Agent, or Firm*—Greenblum & Bernstein, P.L.C.

(57) ABSTRACT

A mail tray singulator for controlling the handling, movement and sensing of mail trays or other mail items into a single file arrangement on a conveyor system for downstream processing. The mail tray singulator includes conveyor modules configured at preferably right angles with respect to one another. The modules are configured so that they can be readily adapted to preexisting conveyor systems with minimal reconfiguration. The system may use differing speed, height and belt friction conveyor belts between adjacent modules to achieve separation and enhance the effect of the right angle configuration between adjacent conveyor modules. Guard rails and side rail rollers may also be employed. Photoeyes, in conjunction with a programmable logic controller, allow the conveyors to be started/stopped based on pre-programmed scenarios.

22 Claims, 4 Drawing Sheets

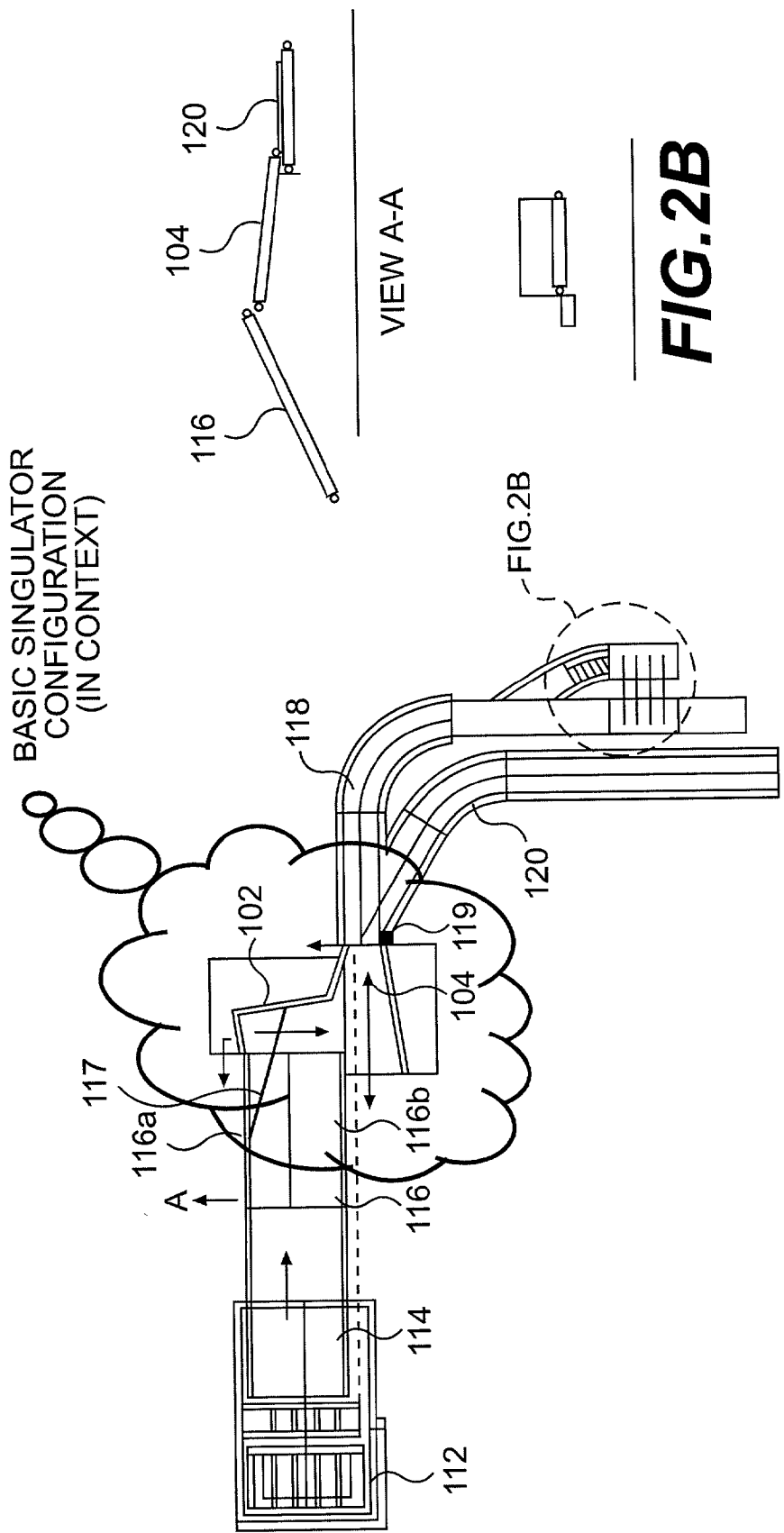

MAIL TRAY SINGULATOR AND METHOD OF USE

BACKGROUND OF THE INVENTION

1. Field of the Invention

The present invention generally relates to a mail tray singulator and, more particularly, to a system and method of controlling the handling, movement and sensing of mail trays or other mail items into a single file arrangement on a conveyor system for downstream processing.

2. Background Description

The sorting of mail is a very complex, time consuming task. In general, the sorting of mail is processed though many stages, including front, middle and back end processes. The front end process, for example, is used to orient and align mail trays; whereas, the middle and back end processes are used for the sorting and processing of the mail for future delivery. These processes can either be manual or automated, depending on the mail sorting facility, whether it be a postal facility or other delivery or transportation facility. A host of factors may also contribute to the automation of the mail sorting facility, from budgetary concerns to modernization initiatives to access to appropriate technologies to a host of other factors.

In general, however, most modern postal facilities have taken major steps toward mechanization (e.g., automation) by the implementation of a number of technologies. These technologies include, amongst others, singulators, letter sorters, facer-cancelers, automatic address readers, parcel sorters, advanced tray conveyors, flat sorters, letter mail coding and stamp-tagging techniques and the like. As a result of these developments, postal facilities have become quite automated over the years, considerably reducing overhead costs.

To begin, the automated front end process is used to align and properly orient mail trays which are initially placed on a conveyor system. In this front end process, a bulk amount of mail trays is removed from intermediate containers and onto a conveyor system. However, the placement of the mail trays on the conveyor is typically in a random order which impedes the preparation of the downstream mail sorting. That is, the mail trays are typically placed on the conveyor system in a side-by-side fashion or other non-aligned manner. But, in order to ensure the mail stream is adequately prepared for downstream automation, the mail trays must be in a single file with a bar code on the leading or trailing edge of the mail tray. To accomplish this, a "singulator" is employed which is capable of manipulating the mail trays into a single file.

There are many types of singulators which are currently utilized by mail sorting facilities. Although these known singulators may be adequate for limited purposes, there exist many known shortcomings ranging from the inability to handle certain packages to being too large to fit within a limited, confined floor space, etc. By way of example, previously developed singulators have been designed to handle a wide range of package sizes and as a result are very large and too costly.

By way of further examples, in one type of singulator system a series of cascading metal chutes are incorporated at right angles. In addition to the metal chutes, metering belts are used to singulate and de-stack clumps of parcels of various sizes. Another known system uses skewed rollers to pull the mail trays or parcels to one side, followed by a succession of narrowing belts to remove side-by-side products, with a recirculation loop. In still another singulator system, a series of thin belts running in parallel with "pop-ups" in between the belts is provided. A vision system detects the location of various products on the narrow belts and an encoder directs the pop-ups to activate, as required, to cause the items to be transported off the singulator one at a time. Another singular system known to exist uses a robotic pallet unloader that employs a large inverted cone to separate the mail stream, followed by a series of conveyor transport modules sized to ensure proper orientation of the trays as they exit from the system. However, in all of these known systems, the footprint or layout is quite large (e.g., exceeding 100 sq./ft), and cannot easily be fitted within a confined floor space. Also, these known systems include complex components which require extensive maintenance and repair, which is costly and time consuming.

SUMMARY OF THE INVENTION

In a first aspect of the invention, a system is provided for aligning at least two mail trays into a single file. The system has a first conveyor module for transporting at least two mail trays in a first direction and a second conveyor module for transporting the at least two mail trays in a direction substantially orthogonal to the first direction. The second conveyor module changes a positioning of the at least two mail trays into the single file such that, in embodiments, a bar code label may be on the leading or trailing edge of the mail tray. This allows for a uniform orientation of the mail trays.

In another aspect of the present invention, a system is provided which includes three conveyor modules. A first conveyor module transports the mail trays in a side-by-side configuration in a first direction and the second conveyor module transports the mail trays in a second direction different than the first direction. A third conveyor module transports the mail trays in a third direction in a single file arrangement substantially orthogonal to the second direction. The second conveyor module may equally transport the mail trays in a single file in the second direction.

In still yet another aspect of the present invention, a method is provided for aligning the mail trays into a single file. In the method, mail trays are placed on a first conveying system in a collective series of two or more adjacent or side-by-side arrangement. The mail trays are then transported downstream in a first direction to a second conveying system. At the second conveying system, the mail trays are transitioned from the first conveying system to the second conveying system. The transition step includes changing the mail trays from the collective series of two or more adjacent or side-by-side arrangement into a single file of mail trays traveling in a second direction different than the first direction. The speeds of the first conveying system and the second conveying system may be regulated and, in further embodiments, the first conveying system may be stopped and restarted depending on the positioning of the mail trays. The mail trays may also transition between the second conveying system and a third conveying system, where the third conveying system transports the mail trays in the single file in a direction substantially orthogonal to the second direction.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows an additional embodiment of the mail tray singulator of the present invention incorporated into a conveyor system for transporting mail trays;

DETAILED DESCRIPTION OF A PREFERRED EMBODIMENT OF THE INVENTION

The present invention is directed to a mail tray singulator and method of use. Although the description provided herein is directed mainly to the attainment of single file alignment of mail trays, it should be recognized that mail packages and other items of a known dimension may equally be used with the present invention. As such, the present invention is not to be limited in any manner, whatsoever, to the alignment of mail trays; however, for simplicity of discussion and for exemplary embodiments and illustrative purposes the use of mail trays is mainly discussed herein.

In this system of the present invention, mail trays or packages (of a certain dimension) are capable of being aligned or oriented into a single file along a conveyor system. This is accomplished by a system that includes, in embodiments, belt conveyor modules configured at preferably right angles with respect to one another. The modules are configured so that they can be readily adapted to pre-existing conveyor systems with minimal reconfiguration. The system of the present invention, in embodiments, uses differing speed, height and belt friction conveyor belts (or other transporting mechanisms) between adjacent conveyor modules to achieve separation and enhance the effect of the right angle configuration between adjacent conveyor modules. Guard rails and side rail rollers may also be employed to promote the smooth mail tray flow and prevent mail tray jams or backlogs within the system. The system of the present invention is capable of uniformly orientating and "singulating" randomly placed mail trays or packages which are of a relatively homogenous design.

Mail Tray Singulator of the Present Invention

Figure 1:
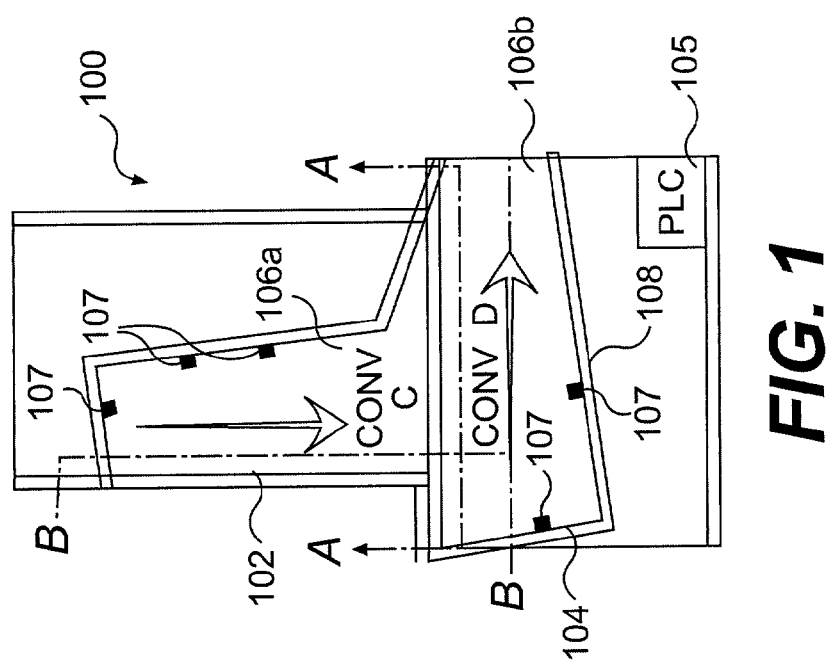
FIG. 1 is a top plan view of an embodiment of the mail tray singulator of the present invention.

Referring now to FIG. 1, a top plan view of the mail tray singulator of the present invention is shown. The mail tray singulator is depicted generally as reference numeral 100 and includes a first conveyor module 102 and a second conveyor module 104, oriented substantially orthogonal to the first conveyor system 102. In other words, the conveyor system of the first conveyor module 102 is positioned at a substantial right angle with respect to the conveyor system of the second conveyor module 104. Different angles may be used in order to singulate the mail trays, alone. In this manner, mail trays entering the first conveyor module 102, in a first direction, are re-directed into a second direction by the second conveyor module 104. By using this system, as will be discussed in greater detail below, the mail stream can now be converted from a collective series of two or more adjacent or side-by-side mail trays (upstream from the first conveyor module 102) into a single file mail stream (on the first or second conveyor module and downstream thereof) which are uniformly orientated for downstream processing.

Still referring to FIG. 1, each conveyor module 102, 104 includes friction belts, conveyors or other transporting mechanisms 106a, 106b, respectively. In embodiments, each successive conveyor has a higher coefficient of friction than a previous conveyor so that the mail tray on a preceding conveyor module, for example, the first conveyor module 102, can be easily transported to the adjacent or successive conveyor, i.e., from the first conveyor module 102 to the second conveyor module 104. Also, it is contemplated by the present invention that each successive conveyor will run at a faster speed than a previous, upstream conveyor. In this manner, the faster running conveyor will take control of the mail tray during the transition from the previous, upstream conveyor module.

In further embodiments, the controlling effect of the mail trays may be enhanced by stopping the previous, upstream conveyor as the mail tray arrives at the succeeding conveyor. This aspect, as with the other aspects, of the present invention may be controlled by a programmable logic controller (PLC) 105 which is capable of collecting signals from photoeyes or other types of sensors 107 strategically placed along the conveyor modules 102, 104. By this control, the conveyors of each conveyor module 102, 104 can be turned "on" or "off" according to the logic scenarios pre-programmed into the PLC 105. The conveyor modules 102, 104 may also be pre-programmed to run at different speeds, sense different items, etc. Now, owing to the geometry of the mail trays, this starting and stopping of the conveyors along with the series of right angle configurations achieves the intended effect of transforming the mail stream from a collective series of two or more adjacent or side-by-side mail trays into a single file mail stream for further downstream processing. The system of the present invention may also orient the mail trays such that tray labels are on the leading or trailing edges of the mail tray.

FIG. 1 also shows side rail guards 108 which prevent the mail trays from falling off the conveyors of the present invention. The side rail guards 108 may be positioned along the edges of the conveyor modules 102, 104. In addition to the side guard rails 108, side rail rollers (FIGS. 3 and 4) located proximate to or incorporated into the side rail guards 108 may also be provided in order to promote smooth mail tray flow and to prevent the mail trays from jamming within the system.

FIG. 2 shows the mail tray singulator of the present invention incorporated into a conveyor system. It should be readily understood by those of ordinary skill in the art that the conveyor modules 102, 104 are configured so that they can be readily adapted to preexisting conveyor systems with minimal reconfiguration. Also, more than two conveyor modules may be used to form the present invention, i.e., any of the conveyor modules shown in FIG. 2. Additionally, it is contemplated that the conveyor modules may include belts, rollers or other conveying or transporting mechanisms; however, for discussion and illustrative purposes only conveyors are generally discussed herein.

By way of discussion of FIG. 2, a container 112 is used to initially transport the mail trays between processing stations, mail facilities or the like. The mail trays are loaded onto a conveyor module 114 (from the container 112). When placed on the conveyor module 114, the mail trays are typically in a collective series of two or more adjacent or side-by-side arrangement or, in embodiments, may be in a single plane (no stacking). The mail trays are then transported to the conveyor module 116. The conveyor module 116 may include a split conveyor having a first conveyor 116a and a second conveyor 116b, where each conveyor 116a and 116b can be individually controlled. As further seen, a guide rail 117 extends between the conveyor 116a and 102, towards conveyor 116b. This rail 117 directs the packages, mail trays, etc. towards the conveyor 104. The conveyor 116a may employ skewed rollers in order to facilitate the transportation of the mail trays, packages, etc. towards the conveyor 116b and onto the conveyor 102.

Upon entering the first conveyor module 102, the mail trays, previously arranged in a side-by-side arrangement, are re-directed substantially orthogonal to the direction of at least the conveyor module 116. It is at this time that the mail trays are automatically uniformly oriented into a single file for transport to the second conveyor module 104 and for downstream processing though conveyors 118 or 120. It should be recognized by those of ordinary skill in the art that the conveyor 116 may and for downstream processing though conveyors 118 or 120. It should be recognized by those of ordinary skill in the art that the conveyor 116 may be incorporated into the present invention such that both conveyor module 116 and substantially orthogonally positioned first conveyor module 102 form the overall configuration of the present invention. Alternatively, conveyor modules 102, 104 and 116 (or only 102, 104) may equally form the overall configuration of the present invention.

In any of the above scenarios, the reorientation of the mail trays into a substantially uniformly oriented single file is mainly due to the arrangement between the first and second conveyor modules 102, 104. Alternatively, the reorientation of the mail trays into a uniformly oriented single file may be due to the arrangement between the conveyor 116 and the first conveyor module 102. In either scenario, the mail trays change direction after the transition between the conveyor modules 116, 102 and 104, respectively, such that a single file arrangement is achieved by the present invention. During these or any other stages, the mail trays may contact the side rail guards 108 and/or side rollers 110, which ensure that the mail trays will be smoothly transported though the remaining system.

Figure 3:
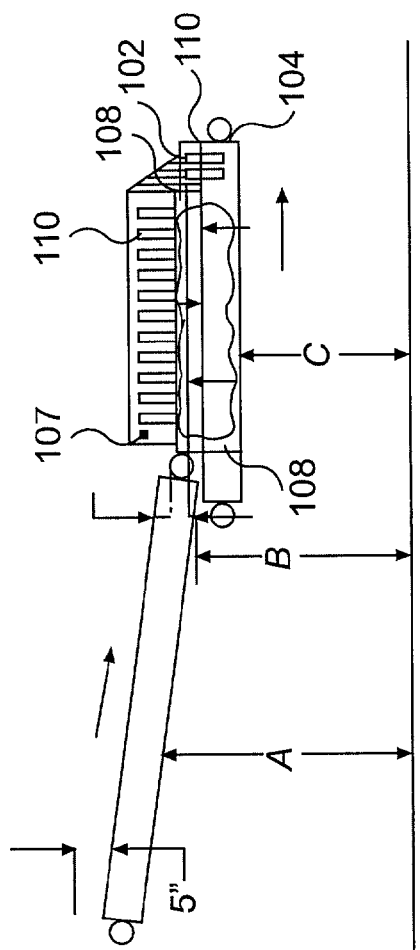
FIG. 3 shows a cross sectional view along line A—A of FIG. 2.

FIG. 3 shows a cross sectional view along line A—A of FIG. 2. This view shows a height difference between each adjacent conveyor module 102, 104 and 116, creating a slight waterfall effect as a mail tray transitions between the higher module to the succeeding lower module. This waterfall effect causes the weight of the mail tray to shift forward, ensuring that the succeeding conveyor module will take control of the mail tray. More specifically, conveyor module 116 is at a first height "A", first conveyor module 102 is at a second height "B" and second conveyor module 104 is at a third height "C", where A>B>C. The side rail guards 108 and side rollers 110 are also shown.

Figure 4:
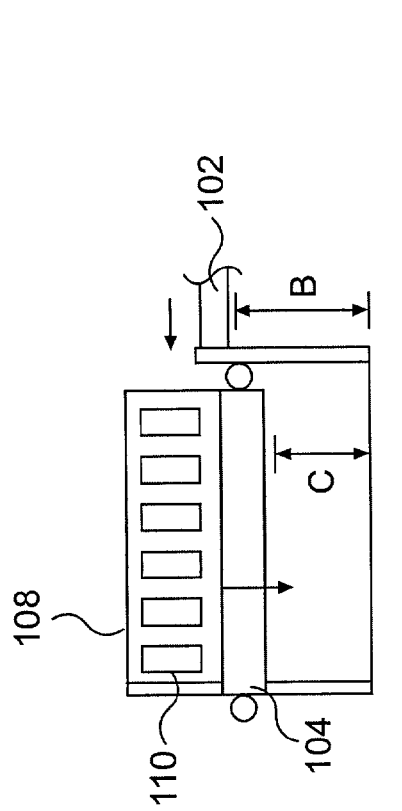
FIG. 4 shows a cross sectional view along line B—B of FIG. 2.

FIG. 4 shows a cross sectional view along line B—B of FIG. 2. In this view, the side rail guards 108 and side rollers 110 are shown mounted to sides or edges of the second conveyor module 104. The guard rails 108 and side rollers 110 may equally be mounted to sides or edges of the first conveyor module 102. It is also shown that the first conveyor module 102 is positioned higher than the second conveyor module 104, causing the waterfall effect between conveyor modules.

Method of Using the Mail Tray Singulator of the Present Invention

Figure 5:
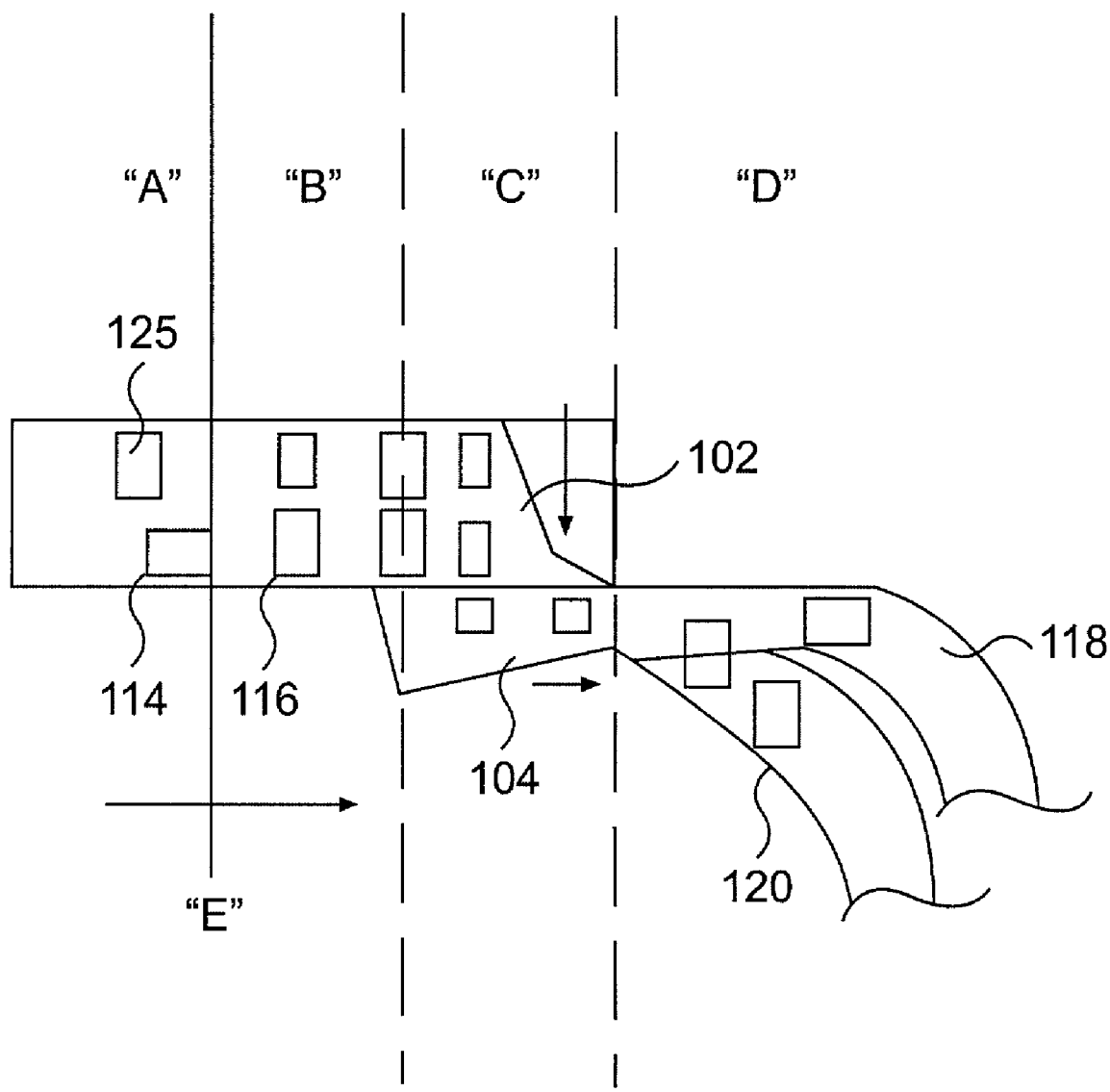
FIG. 5 shows a mail tray flow through the system of the present invention.

FIG. 5 shows a mail tray flow through the system of the present invention. In section "A", the mail trays 125 are randomly placed on the conveyor module 114, via the container 112 (not shown). As seen, the mail trays 125 are in a collective series of two or more adjacent or side-by-side mail tray rows. In section "B", the mail trays 125 are transported to conveyor module 116. During these stages, the mail trays are transported in a first direction shown by arrow "E".

At the junction between sections "B" and "C", the mail trays 125 transition between the conveyor 116 and the first conveyor module 102. As the mail trays 125 transition to the first conveyor module 102, the mail trays change direction, substantially orthogonal to the first direction. (This is shown by arrow "F".) At this stage, the mail trays 125 are now in a uniformly oriented, single file arrangement in the direction of arrow "F". In section "C", the mail trays are further transported to the second conveyor module 104 (which is positioned lower than the first conveyor module 102). At the second conveyor module 104, the mail trays again change direction, substantially orthogonal to the direction of arrow "F". Now, the mail trays remain oriented in a single file and are transported downstream to either conveyor 118 or 120 or other conveyor system for sorting, processing and future mail delivery (section "D").

It is noted that rearward mail trays located on the conveyor module 116 can only be moved onto the first conveyor module 102 after a leading mail tray is moved towards the conveyor module 104. This is due to the dimensions of the first conveyor module 102, which accommodates only a single file of mail trays. It should further be recognized that the side rollers 110 on the first conveyor module 102 may assist in the movement of the mail trays towards the second conveyor module 104, and that the guard rails 108 ensure that the rearwardly located mail tray will not push the forwardly positioned mail tray off the first conveyer module 102.

Figure 6:
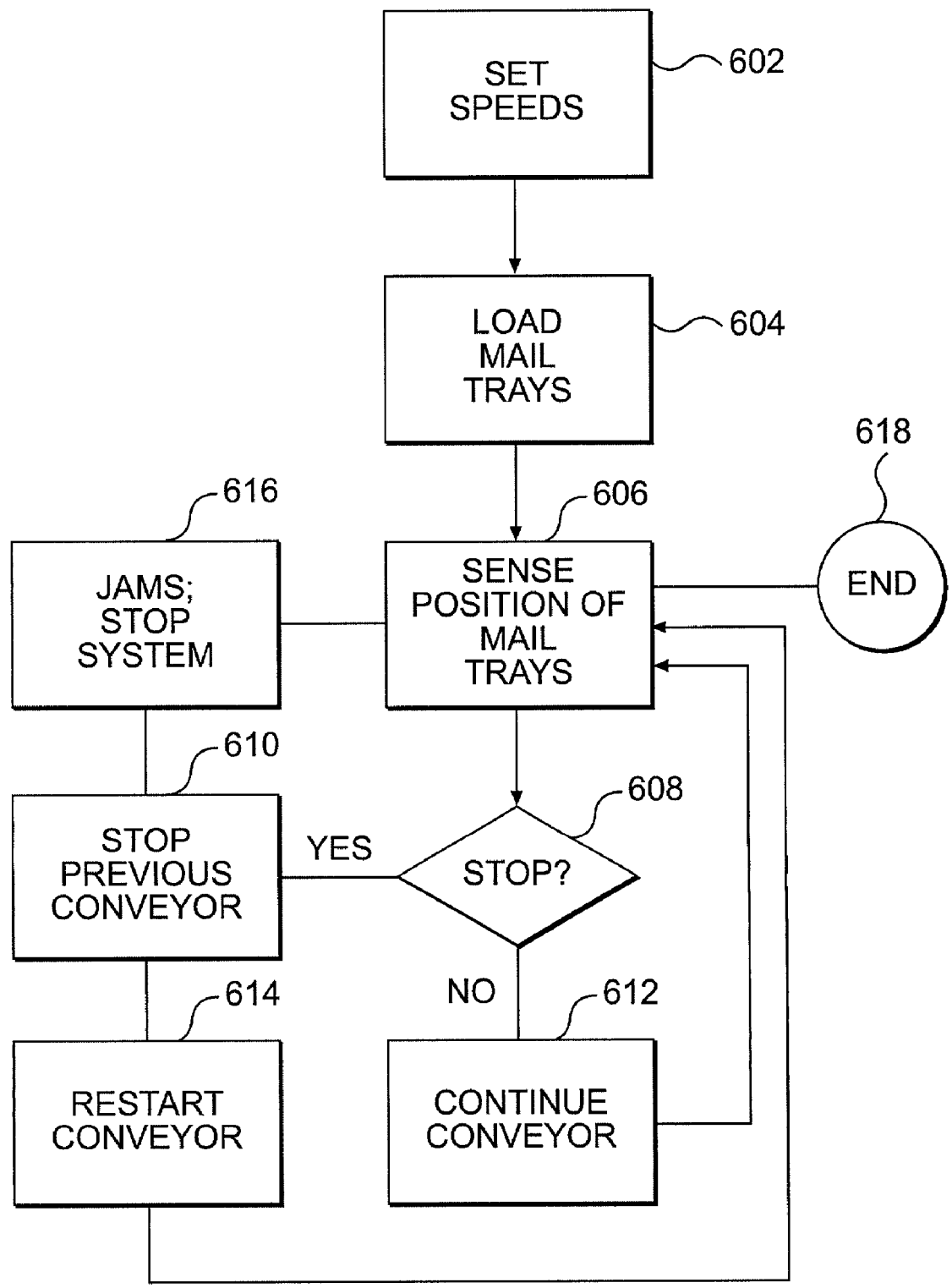
FIG. 6 is a flow diagram showing the steps of implementing the method of the present invention.

FIG. 6 is a flow diagram showing the steps of implementing the method of the present invention. The steps of the present invention may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). FIG. 6 may equally represent a high level block diagram of the system of the present invention, implementing the steps thereof.

In particular, in step 602, the PLC sets the various speeds of the conveyors. In step 604, the mail trays are loaded onto the conveyor and transport begins between successive conveyors. In step 606, a sensor senses the position of the mail trays during the various stages. In step 608, a determination is made as to whether to stop a conveyor based on the positioning of a mail tray. If a mail tray is between conveyors, the system of the present invention will, in embodiments, stop the previous conveyor in step 610. Once the mail tray is positioned on the successive conveyor, the system of the present invention will restart the previous conveyor (step 614). If the mail tray is not between conveyors, the system of the present invention will continue to monitor the mail trays and continue with the running of the conveyors in step 612. This process continues for all successive conveyors (as determined by the sensor in step 606). When no further mail trays are sensed, then the control ends at step 618. In embodiments, the sensors, in step 606, can also determine whether there are any "jams" or backlogs of the mail trays. If so, in step 616, the system will stop.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A system for aligning at least two mail items into a single file, comprising:
   a first conveyor module which transports the at least two mail items in a first direction; and
   a second conveyor module, adjacent the first conveyor module, which transports the at least two mail items in a direction substantially orthogonal to the first direction, the second conveyor module capable of changing a positioning of the at least two mail items into a uniformly oriented, single file arrangement.

2. The system of claim 1, wherein the first conveyor module includes a conveyor having a first coefficient of friction and the second conveyor module includes a conveyor having a second coefficient of friction higher than the first coefficient of friction.

3. The system of claim 2, wherein the conveyor of the second conveyor module has a speed faster than a speed of the conveyor of the first conveyor module.

4. The system of claim 3, wherein the conveyor of the first conveyor module has a height higher than a height of the conveyor of the second conveyor module.

5. The system of claim 1, wherein the first conveyor module includes a transporting mechanism having a first speed and the second conveyor module includes a transporting mechanism having a second speed faster than the first speed.

6. The system of claim 1, wherein the first conveyor module includes a transporting mechanism having a first height and the second conveyor module includes a transporting mechanism having a second height lower than the first height.

7. The system of claim 1, further comprising another conveyor module adjacent the first conveyor module, the another conveyor module transporting non-aligned at least two mail items in a direction substantially orthogonal to the first direction such that one or more of the at least two mail items are transported to the first conveyor module and re-directed into the first direction.

8. The system of claim 7, wherein the first conveyor module, the second conveyor module and the another conveyor module each include a transporting mechanism, the transporting mechanism of the first conveyor module has a coefficient of friction of "A", the transporting mechanism of the second conveyor module has a coefficient of friction of "B" and the transporting mechanism of the another conveyor has a coefficient friction of "C", where B>A>C.

9. The system of claim 7, wherein the first conveyor module, the second conveyor module and the another conveyor module each include a transporting mechanism, the transporting mechanism of the first conveyor module has a speed of "D", the transporting mechanism of the second conveyor module has a speed of "E" and the transporting mechanism of the another conveyor has a speed of "F", where F>E>D.

10. The system of claim 7, wherein the first conveyor module, the second conveyor module and the another conveyor module each have a height such that the height of the another conveyor module is greater than the height of the first conveyor module and the height of the first conveyor module is greater than the height of the second conveyor.

11. The system of claim 7, further comprising at least one sensor for detecting a position of the at least two mail items along either one of the first conveyor module and the second conveyor module.

12. The system of claim 7, wherein the another conveyor module is a split conveyor module having two parallel transporting mechanisms for transporting the at least two mail items towards the first conveyor module.

13. The system of claim 12, wherein each of the two parallel transporting mechanisms are separately controllable.

14. The system of claim 1, further comprising a programmable logic controller for controlling speeds of conveyors of the first and second conveyor modules.

15. The system of claim 14, further comprising at least one sensor, the at least one sensor and the programmable logic controller being capable of starting and stopping transporting mechanisms of the at least one of the first and second conveyor modules.

16. The system of claim 1, wherein the at least two mail items initially positioned in a side-by-side configuration are realigned in a single file configuration by the first and second conveyor module for downstream processing.

17. A system for aligning mail items into a single file, comprising:

a first conveyor module which transports the mail items in a side-by-side configuration in a first direction;

a second conveyor module, adjacent the first conveyor module, which transports the mail items in a second direction different than the first direction; and a third conveyor module, adjacent the second conveyor module, which transports the mail items in a third direction in a uniformly oriented, single file arrangement substantially orthogonal to the second direction.

18. The system of claim 17, wherein the second direction is substantially orthogonal to both the first direction and the third direction.

19. The system of claim 17, wherein the first conveyor module, the second conveyor module and the third conveyor module each include a conveying system, the conveying system of the first conveyor module has a coefficient of friction of "A", the conveying system of the second conveyor module has a coefficient of friction of "B" and the conveying system of the third conveyor has a coefficient friction of "C", where C>B>A.

20. The system of claim 19, wherein:

the conveying system of the third conveyor module has a speed greater than a speed of the first and second conveyor systems; and the conveying system of the first and second conveyor module has a height greater than a height of the third conveying system.

21. The system of claim 19, wherein the second conveyor module transports the mail items in single file in the second direction substantially orthogonal to the first direction.

22. A system for aligning at least two mail items into a single file, comprising:

a first conveyor module which transports the at least two mail items in a first direction; and a second conveyor module, adjacent the first conveyor module, which transports the at least two mail items in a direction different than the first direction, the second conveyor module capable of changing a positioning of the at least two mail items into a single file arrangement, wherein the first conveyor module includes a conveyor having a first coefficient of friction and the second conveyor module includes a conveyor having a second coefficient of friction higher than the first coefficient of friction.

* * * * *